United States Patent

[11] 3,590,498

| [72] | Inventor | Sol Landzerg<br>22-18 Clentonville St., Whitestone, N.Y. 11357 |
|---|---|---|
| [21] | Appl. No. | 823,717 |
| [22] | Filed | May 12, 1969 |
| [45] | Patented | July 6, 1971 |

[54] PROGRAMMED INSTRUCTION DEVICE
5 Claims, 5 Drawing Figs.

[52] U.S. Cl. ........................................... 35/9 R, 40/71
[51] Int. Cl. ........................................... G09b 3/06
[50] Field of Search ........................................... 35/9, 74, 9 A, 31 C, 35 D; 350/134, 143; 40/70 A, 71

[56] References Cited
UNITED STATES PATENTS

| 1,749,226 | 3/1930 | Pressey | 35/9 X |
| 2,511,334 | 6/1950 | Gruber | 350/134 |
| 2,663,091 | 12/1953 | Brown | 35/9 |
| 2,871,577 | 2/1965 | Davis | 35/9 |
| 2,983,054 | 5/1961 | Twyford | 35/9 |
| 3,166,858 | 1/1965 | Huetten | 35/9 |

Primary Examiner—Wm H. Grieb
Attorney—Roberts and Cohen

ABSTRACT: As an illustrative form of a programmed instruction device there is disclosed a viewing device in which is rotated a disc having a circular array of frames in each of which there is intelligence such as a picture or question with which are associated two or more items of intelligence such as answers or identification only one of which is correct. Two or more operational levers are provided which are associated with the plurality of information items and only one of which is capable of rotating the aforesaid disc in association with each frame depending on whether or not the properly related intelligence item is selected. If an incorrect information item is selected, the disc is not rotated and thus only operation of the proper lever for a given frame can cause rotation of the disc and advancement to the next frame. The intelligence in successive frames is related in progressive instructional order.

INVENTOR
SOL LANDZBERG

Roberts & Cohen
ATTORNEYS

INVENTOR.
SOL LANDZBERG
BY
Roberts & Cohen
ATTORNEYS 3,590,498

PROGRAMMED INSTRUCTION DEVICE

BACKGROUND

Programmed instruction is a teaching and learning system which, according to the technique employed in accordance with the invention, involves presenting a sequence of intelligence items such as questions or pictures or the like. These intelligence items are arranged to progress from the more simple concepts to be taught to the more complex aspects thereof.

The student involved actively participates and must respond to each step. He is given sequenced steps of instruction and is given immediate knowledge as to his proper acquisition of such information.

As a result of the aforesaid, a correct response by a student is rewarded and correct responses are thus reinforced. Incorrect answers or response are not allowed to become part of the student's repertoire and receive what is known as negative reinforcement.

In the technique employed in accordance with the invention, the student proceeds from item to item or from one frame to the next successive frame in the series until he has completed the entire concept or unit. The student thus proceeds at his own pace impeded only by his inability to select a correct response.

PRIOR ART

There are various known devices which permit a student or operator to select a response or, in other words, to select a correct answer to a presented problem.

One such device appears in U.S. Pat. No. 2,970,387, which was issued Feb. 7, 1961 to R. L. Dean. This device employs a technique whereby there is an advance to a randomly selected problem after a student has chosen the correct answer to a previously presented problem. The present invention distinguishes from this known device in that each problem follows the preceding problem in a prescribed programmed manner.

U.S. Pat. No. 2,970,387 also involves the mechanical concept by which the momentum of a returning wheel produces overrunning of the wheel to establish a new problem condition. This approach results directly in a random selection of problems which is distinguishable from the technique employed in accordance with the present invention.

Also involved in the aforesaid patent is the concept of employing a plurality of manually engageable actuators, only some of which are accessible at a given time. As will be seen, in accordance with the present invention, the actuating elements are always accessible and simulated actuators are not employed as in the prior art.

Also inherent in the aforesaid patent is the feature of employing a stop means for preventing rotation of a wheel when a simulated actuator is selected by the choice of an incorrect answer. In accordance with the invention, it is the inability of a lever, as will be seen, after its displacement, to effect a change of problem which indicates that a wrong response has been made.

SUMMARY

The device provided in accordance with the instant invention is a programmed instruction device. It permits information to be presented in increments with the student or operator making a choice of one of a plurality of answers or responses by depressing or operating one of a like plurality of levers or other such operating mechanisms.

If, for example, the correct lever is depressed, the disc moves to the next successive frame or intelligence item. Each frame includes intelligence which builds on the intelligence of the preceding frame. If, however, an incorrect lever is depressed, the disc does not progress and the student or operator is made aware that his response has been an incorrect one.

It is one object of the invention to provide an educational device which avoids presenting intelligence items in a random and haphazard manner.

It is another object of the invention to provide intelligence items in a sequence which promotes the systematic education of a student.

It is yet another object of the invention to provide a programmed instruction device which is readily and economically manufactured and which may assume a form which stimulates the cooperation of students and the like.

In achieving the above and other of the objectives of the invention, there is provided an apparatus which comprises a first means providing a sequence of first items of intelligence and in association with each of these first items a plurality of second items of intelligence. Only one of the second items of intelligence relates correctly to the associated first item and the remainder of the second items of intelligence in this group do not relate correctly to the said first item. Second means are provided for transporting the first items of intelligence and the second items associated therewith sequentially through an active or observation zone. The second means include independently operable operating means which correspond in number to the number of second items provided for each such first item. If the lever corresponding to the correct second item of information is operated such as by depressing the same, this will enable the presentation of the next in the sequence of first items. Alternatively, the operator need continue operating the levers until a proper choice has been made.

The first means noted above may preferably include a support having therein a sequence of frames in which are pictures or questions or the like. The support may be, for example, a disc which is selectively engaged for the rotation thereof.

A detailed description of a preferred and illustrative embodiment of the invention is given hereinbelow.

DRAWING

DETAILED DESCRIPTION

FIGS. 1—5 illustrate, generally and without limitation, a programmed instruction device provided in accordance with the invention. This device involves a viewing system in which intelligence items are employed in a circular array to be displaced with a rotary motion past a viewing zone. It will be apparent from the description which follows hereinafter that it is not essential to the invention to employ a viewing apparatus of the type set forth or, in fact, any optical system whatsoever. It will also become apparent that it is not essential to the invention that the intelligence items be arranged in circular array since such items may be provided, for example, in rectilinear array or in any other geometrical arrangement which will permit a sequencing of a series of intelligence items.

Intelligence items as referred to hereinafter may include a wide variety of indicia including but not limited to pictures, printed questions or statements, stereoscopic views, two-dimensional views and the like. The second intelligence items related with the first said items may take the form of answers to questions, responses to situations, solutions to arithmetical problems, identification of material contained in pictures and so on. It is, however, preferred in accordance with the invention that the sequence of intelligence items employed be in a progressive and interrelated mode so that there is effected a progressive building up of information supplied to the student or operator.

In addition to the aforegoing, it should be noted that while intelligence items are hereinafter illustrated as being in association with geometrically limited areas designated as frames, the use of frames is not essential to the invention and a variety of other modes of presentation is likewise possible within the scope of the invention.

Figure 1:
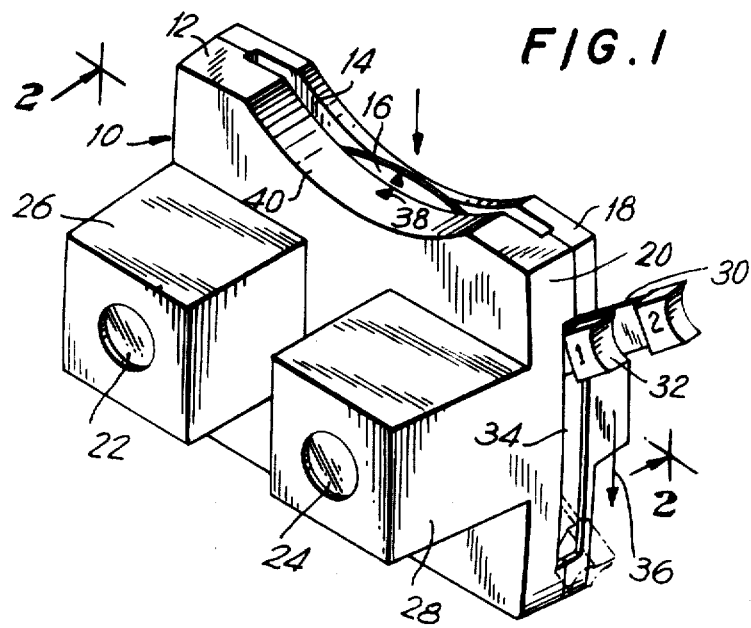
FIG. 1 is a perspective view of a programmed instruction device provided in accordance with a preferred embodiment of the invention.

Referring next to FIG. 1, the programmed instruction device illustrated therein comprises a casing 10 fabricated of plastic, metal, or the like. At the top 12 of the device is provided a slot 14 by means of which a disc 16 can be inserted. The purpose of this disc will be hereinafter discussed in greater detail.

The housing may consist of a front section 18 and a rear section 20 to facilitate the fabrication and assembly thereof. At the rear of the device are located two eyepieces 22 and 24 respectively accommodated in two eyepiece supports 26 and 28.

Although two eyepieces have been illustrated and are useful especially with respect to stereoscopic viewing, it is possible to substitute therefor a single eyepiece and as a matter of fact in certain instances it is possible to omit the use of eyepieces and depend on direct viewing.

Also visible in FIG. 1 are two operating elements or levers 30 and 32. The number of levers corresponds to the number of available responses or answers as will be discussed more fully hereinafter. It is important to note, however, that the number of levers illustrated is arbitrary and that three and more levers may be equally as well employed if more responses or answers are to be provided.

A slot 34 is indicated in the right-hand end of the housing 10. This slot permits a depressing of the actuating members as indicated by the arrow 36. Finally, it will be seen in FIG. 1 that there is provided an index 38 centrally located on the housing 10 and located within the arcuate depression 40 in the top of said housing.

Figure 2:
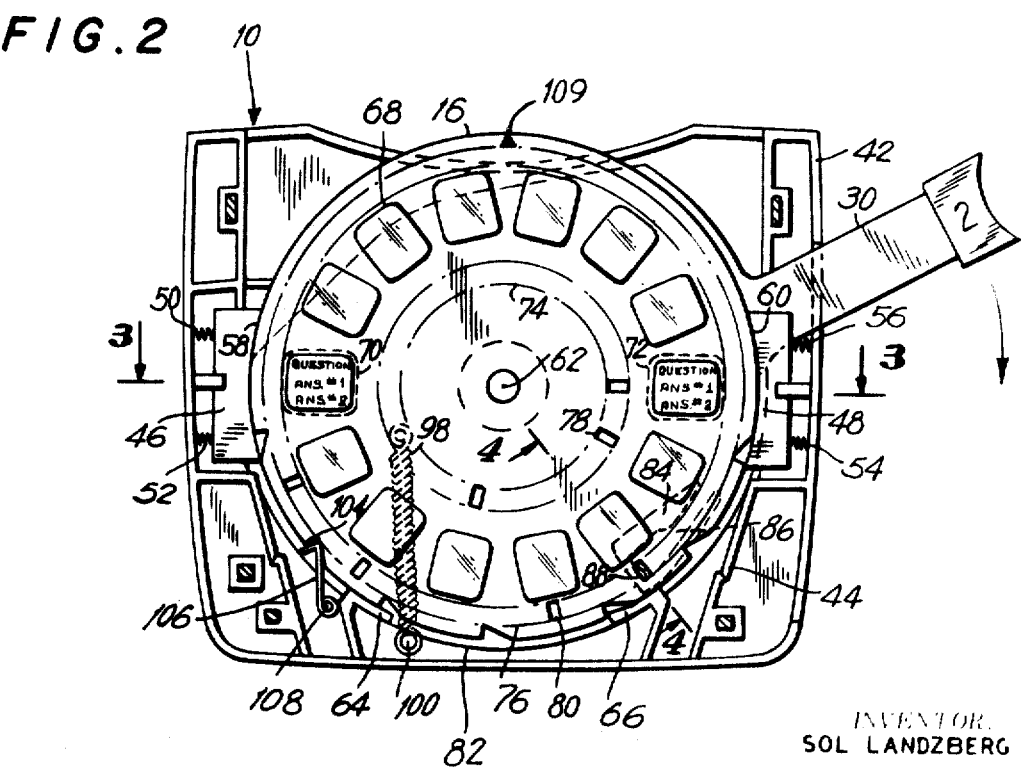
FIG. 2 is a sectional view taken along line 2-2 of FIG. 1.

Referring next to FIG. 2, it is seen that the housing 10 consists of an outer wall 42 within which are installed a plurality of partition and strength providing walls 44. Two sliding blocks 46 and 48 are laterally disposed within the housing and are urged inwardly by means of springs 50 and 52 on the one hand and springs 54 and 56 on the other hand. Said springs permit the outward displacement of blocks 46 and 48 and permit the ready insertion of the disc 16 while yieldably resisting retraction of said disc. The blocks 46 and 48 are moreover provided with arcuate inner surfaces 58 and 60 which serve as a rotational guide for the disc which, as will be seen, is rotatable about the axis 62.

Additional guides appear at the bottom of the housing in the form of elements 64 and 66. No further guiding of the rotation of the disc is required, although obviously additional guides may be provided as desired.

The disc 16 can be fabricated of cardboard, plastic, metal, or the like. Within the outer circumference of the disc is provided a circular array of frames such as, for example, the frame 68. In the illustrated example, stereoscopic viewing is provided. Thus the circular array which is illustrated consists of two semicircular arrays of which there are pairs of frames relating to the same intelligence.

One such pair of frame is indicated at 70 and 72. Therein the frames consist of transparencies bearing a first intelligence item in the form of a question and two associated intelligence items in the form of two proposed answers to the question. Frames 70 and 72 are in this instance identical and only one of these frames need be discussed.

Referring to frame 70 by way of example and as has been indicated hereinabove, only one of the two proposed answers to this question will be properly or correctly related to the associated question. Selection of the proper answer and a depressing of the corresponding lever will permit a partial rotation of the disc 16 to bring the next sequential pair of frames into the active or viewing zone. Depression of the proper lever will depend upon the student's or operator's selection of the correct answer (i.e., answer number 1 or number 2) and the depressing of the corresponding lever bears an identifying number or other such indicia. Numbers have been used by way of illustration. However, it will be readily appreciated that the levers and answers can be matched with one another by an appropriate use of colors, shapes or such.

It will furthermore be understood that, in accordance with the invention, the selection of the wrong answer and the depressing of the corresponding lever will not operate to rotate the disc 16. How this is achieved is next explained below.

Radially inside of the circular array of frames is a zone indicated at 74. Disposed radially outside of the circular array of frames is a zone 76. The zones and circular array of frames are all concentric about axis 62. Slots or openings providing perforated sections or portions in the respective zones are indicated at 78 and 80. For each frame, there will be only one such slot in the corresponding and radially aligned portions of the zones 74 or 76. In other words, in no instance will there be two radially aligned slots. Instead, for each frame, there will be one and only one such slot and means such as next described are employed for engaging the aforesaid slots and providing selective rotation of disc 16.

Figure 5:
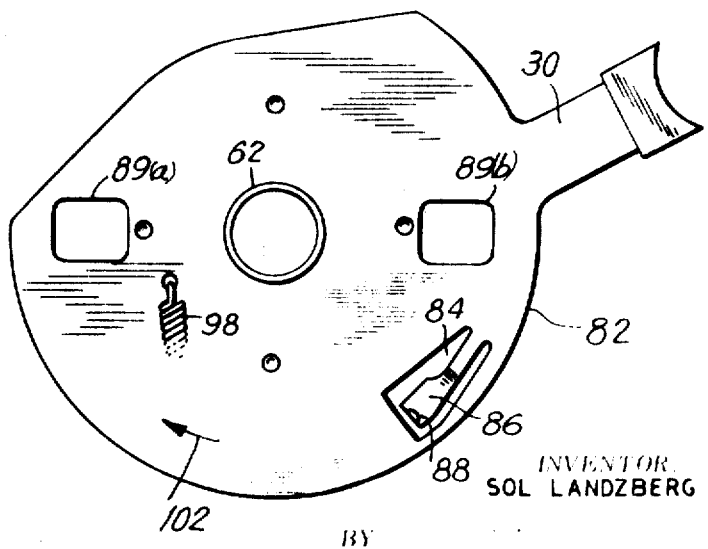
FIG. 5 is a plan view of one of the actuating elements employed in the aforesaid apparatus.

The operating members of which lever 30 appear in FIGS. 2 and 5 are each connected such as for example to a disc 82 which is integral therewith. These discs and levers may be fabricated of a material such as sheet steel, aluminum, plastic, or the like. Each such disc is provided with a cutout 84 forming therein a tongue 86 which constitutes a cantilevered springlike lever having a protrusion 88 at the extremity thereof. Such protrusion extends generally at a right angle to the plane of the associated disc. Windows 89a and b are formed in disc 82 to provide for the passage of light so that the frames can be viewed.

Figure 3:
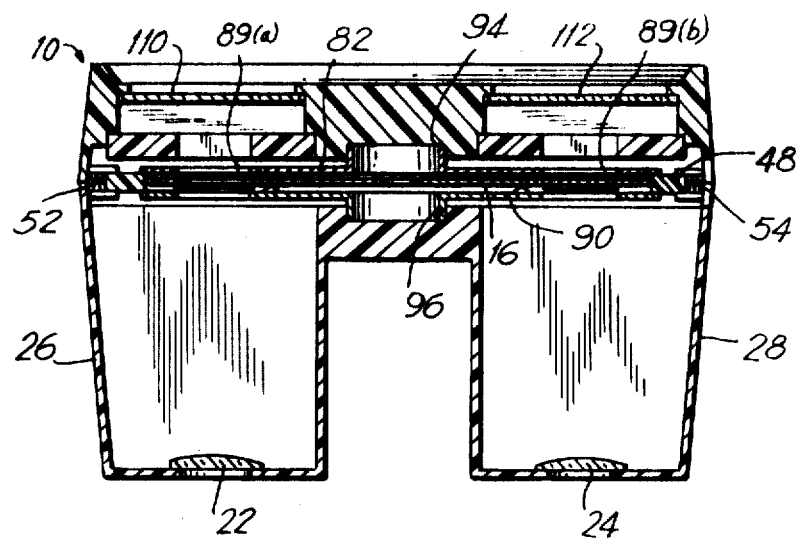
FIG. 3 is a sectional view taken along line 3-3 of FIG. 2.
Figure 4:
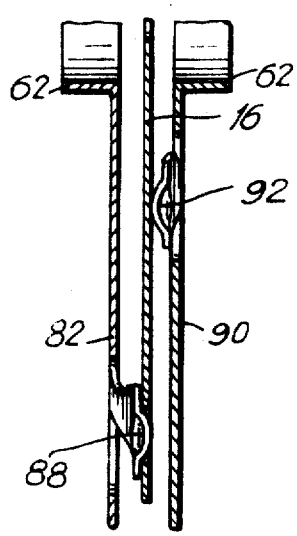
FIG. 4 is a sectional view of selected elements of the apparatus of FIG. 2 taken along line 4-4 of FIG. 2.

FIGS. 3 and 4 illustrate the disc 82 and the second disc 90, the latter said disc being associated with the operating member 32. In these figures it will be seen that the protrusion 88 is aligned with the outermost zone 76. The protrusion 92 of the disc 90 is aligned with the innermost zone 74. Thus it will be seen that a slot in one of these respective zones can be engaged only by a depressing of the corresponding lever or operating member 30 or 32.

Discs 82 and 90 are respectively mounted on bearings 94 and 96. As a consequence thereof, depression of operating members 30 and 32 will be effective to rotate discs 82 or 90 depending upon which operating member is depressed. The stroke of the operating members is limited to bring the frames one by one in sequential order to the viewing zone established by lenses 22 and 24.

Operating members 30 and 32 are normally maintained in their upward positions of rest by means of the springs 98 which are connected to a respective one of the discs 82 or 90 at one end and at the other end to the housing such as indicated at 100. The outer extremities of operating members 30 and 32 are aligned in close juxtaposition when in their positions of rest.

Due to the cantilever structure of the springs supporting protrusions 88 and 92, it will be seen that rotation of the discs as indicated by arrow 102 will cause a driving of the disc 16. Upon return of the driving discs in a direction opposite to that shown by arrow 102, the protrusions will readily withdraw from that slot with which they have previously been engaged. This permits the disc 16 to remain in its rotationally displaced position. To assure that the disc does so remain, the periphery of the disc may be provided with saw-toothed notches 104 (FIG. 2). Cooperating with such notches is a springlike pawl member 106 mounted on the housing as indicated at 108. The cooperating shapes of the pawl and notches enables the disc to be rotated readily in one direction whereas movement of the disc in the opposite direction is impeded.

The aforesaid index 38 (FIG. 1) may be used to align the disc 16 by means of a cooperating mark 109 thereon for proper insertion into the device.

FIG. 3 illustrates entrance windows 110 and 112 through which illuminating light enters for purposes of rendering the frames 68 visible.

It will thus be seen that the invention provides a sequence of questions or other such first items of intelligence in association with which are a plurality of answers or second items of intelligence only one of which relates correctly to the associated first item. It is also seen that there is provided a mechanism for transporting these items sequentially through an active or viewing zone by the use of independently operable operating members which correspond in number to the number of answers of second items of intelligence. When the correct answer is elected and the corresponding operating member depressed, rotation of the aforesaid disc results and the intelligence bearing disc is sequenced to the next logical step in the teaching progression.

The aforesaid protrusions 88 and 92 are engaging devices cooperating with engageable slots or sections in the disc. The slots in the zones 74 and 76 are positioned in these zones to correspond with the problem answers. In other words, the slots are programmed into the disc in accordance with the questions and answers proposed with respect thereto.

The disc 16 is a support disc wherein the frames are, in the illustrated embodiment, aligned in circular array. It is clear, however, that the frames may aligned in rectilinear or other types of arrays provided that appropriate activating mechanisms are employed.

In accordance with the invention, the disc 16 is replaceably accommodated in the housing. Thus a series of such discs can be provided which are viewed in sequential order.

In the illustrated embodiment an optical arrangement having a line of sight determining the active zone has been used. The mechanism of the invention can, however, be fabricated without the use of such optical means.

What I claim is:

1. Apparatus comprising first means providing a sequence of first items of intelligence and, in association with each of said first items, a plurality of second items of intelligence one of which relates correctly to the associated first item and the remainder of which do not, and second means for transporting said first items and the second items associated therewith sequentially through an active zone, said second means including independently operable operating members corresponding in number to the number of second items for each first item, one of the operating members corresponding, for each said first item, to said one second item and being operable to move the next in the sequence of first items and the second items associated therewith into said active zone; said first means including a support including a sequence of frames each having therein one of said first items and including engagement means selectively positioned to be engaged with said one operating member for the displacement of said support; said support including a plurality of selection zones extending adjacent the sequence of frames and equal in number to the number of operating members, said engagement means including in predetermined relationship to each said frame an engageable section in one of said selection zones, said operating members each including engagement members aligned with one of said selection zones to engage engageable sections therein; said support being a support disc wherein the frames are aligned in circular array, the engageable sections being perforated sections disposed in circular arrays constituting said selection zones and concentric with the first said array; said apparatus further comprising a housing to which said operating members are connected, said disc being replaceably accommodated in said housing and adapted for rotation therein, and optical means determining said active zone; each said operating member including a drive disc, a lever on said disc protruding from the housing, means on the drive disc constituting one of said engagement members and adapted for unidirectional engagement with the perforated sections in the corresponding selection zone, and identifying means for identifying the lever with one of the second items of intelligence.

2. Apparatus as claimed in claim 1 comprising means in the housing to support the support disc for rotational movement and pawl means in the housing to permit unidirectional rotation of the support disc only.

3. Apparatus as claimed in claim 2 comprising means for yieldably retaining the support disc in the housing.

4. Apparatus as claimed in claim 1 wherein the first items of intelligence are arranged in a related and progressive sequence.

5. Apparatus as claimed in claim 1 wherein the operating members have positions of rest in which they are juxtaposed.